United States Patent
Bierwith

Patent Number: 5,417,518
Date of Patent: May 23, 1995

[54] TOOTH MOUNTING ADAPTOR FOR EXCAVATION BUCKET

[76] Inventor: Robert Bierwith, 1331 Eastshore Hwy., Berkeley, Calif. 94710

[21] Appl. No.: 46,674

[22] Filed: Apr. 14, 1993

[51] Int. Cl.⁶ .............................................. B25G 3/20
[52] U.S. Cl. .................................. 403/374; 403/318; 403/298; 37/457
[58] Field of Search ................ 37/455, 456, 457, 458, 37/459; 403/379, 316, 318, 374, 298; 299/92

[56] References Cited

U.S. PATENT DOCUMENTS

| | | |
|---|---|---|
| 1,582,095 | 4/1926 | Symes et al. |
| 2,483,032 | 9/1949 | Baer ............................ 37/457 |
| 2,927,386 | 3/1960 | Day ............................. 37/457 |
| 2,951,300 | 9/1960 | Ratkowski ................... 37/457 |
| 2,994,141 | 8/1961 | Stephenson . |
| 3,160,967 | 12/1964 | Nichols . |
| 3,572,785 | 3/1971 | Larson . |
| 3,650,053 | 3/1972 | Baer ............................ 299/92 |
| 3,722,932 | 3/1973 | Dougall . |
| 4,267,653 | 5/1981 | Hahn et al. . |
| 4,271,615 | 6/1981 | Jones . |
| 4,413,432 | 11/1983 | Bierwith . |
| 4,663,867 | 5/1987 | Hahn et al. . |
| 5,134,793 | 8/1992 | Bierwith . |

FOREIGN PATENT DOCUMENTS

| | | | |
|---|---|---|---|
| 0806055 | 2/1969 | Canada ............................ 37/456 |
| 0369226 | 11/1973 | U.S.S.R. ......................... 37/457 |

*Primary Examiner*—Thomas E. Denion
*Attorney, Agent, or Firm*—Townsend and Townsend Khourie and Crew

[57] ABSTRACT

An improved keeper pin mount and method for releasably locking an excavation tooth to an adaptor of an excavation bucket. The keeper pin has a wedge block and a wedge. The wedge block has a shear pin and a single replaceable tooth. The wedge has a series of teeth that progressively engage the single tooth of the wedge block. The single tooth has a spring steel projection bonded to a rubber block. This block is removably received in a recess in the wedge block. The rubber block bears against the adjacent inner surface of the recess of the wedge block. The wedge block is first put into place in the hole provided for the keeper pin; then the wedge is inserted in the hole, and the teeth progressively move past the single tooth of the wedge block. The resilience of the rubber block to which the single tooth is bonded allows the wedge block to be driven past the teeth of the wedge until the keeper pin is tightly in place. This causes the spring tooth of the wedge block to engage one of the teeth of the wedge. A sheer pin on the wedge block prevents the keeper pin from being "jacked out". To remove the keeper pin, the wedge block is driven downwardly, thus shearing the shear pin and allowing the keeper pin to fall through the opening. The keeper pin can be reused by replacing the shear pin.

11 Claims, 3 Drawing Sheets

TOOTH MOUNTING ADAPTOR FOR EXCAVATION BUCKET

This invention relates to improvements in the mounting of excavation teeth on an excavation bucket for industrial digging purposes, and, more particularly, to a tooth mount and a method of mounting an excavation tooth so that the tooth can be quickly and easily removed from an excavation bucket to which it is attached.

BACKGROUND OF THE INVENTION

Wedge shaped devices, known collectively as keeper pins, have been used quite extensively in the past for interconnecting excavation teeth on an adaptor of an excavation bucket. The teeth, when mounted on the bucket are in position for digging and excavating. While the teeth are subjected to heavy abuse for a period they must be replaced due to wear. To replace a tooth, the keeper pin must be separated from the tooth and an adapter on the bucket.

An ideal keeper pin must be easy to install and easy to remove, yet the keeper pin must be positively locked in place on the adaptor in order for the keeper pin to interconnect the tooth and the adapter correctly. The keeper pin must have a wedging action to pull the tooth tight to the adaptor and to allow take up for wear in the tooth or the adaptor itself.

DESCRIPTION OF THE BACKGROUND ART

Disclosures relating to wedge-shaped devices for interconnecting an adaptor and an excavation tooth are found in the following U.S. Patents:

| | |
|---|---|
| 1,582,095 | 4,267,653 |
| 994,141 | 4,271,615 |
| 160,967 | 4,413,432 |
| 3,572,785 | 5,134,793 |
| 3,722,932 | |

While the structures of these disclosures are satisfactory for special applications, they all lack simplicity of construction; thus, improvements in keeper pins have always and are now sought after so that the job of mounting and locking the teeth in place can be greatly shortened.

SUMMARY OF THE INVENTION

The present invention is directed to an improved keeper pin mount and method for releasably locking an excavation tooth to an adaptor of an excavation bucket. The keeper pin has a pair of wedge-shaped elements, one element being called a wedge block and the other element being called a wedge. The wedge block has a shear pin and a replaceable tooth. The wedge has a series of teeth that progressively engage the single tooth of the wedge block. The tooth has a spring steel tooth projection bonded to a rubber block. This block is removably received in a recess in the wedge block.

The rubber block bears against the adjacent inner surface of the recess of the wedge block. After the wedge block has been put into place in the hole provided for the keeper pin, the wedge is inserted in the hole, and the teeth progressively move past the single tooth of the wedge block. The resilience of the rubber block to which the single tooth is bonded is such as to allow the wedge block to be driven by a hammer past the teeth of the wedge until the keeper pin is tightly in place. This is usually achieved by light blows from the hammer.

This action causes the spring tooth of the wedge block to engage one of the teeth of the wedge. Thus, the wedge block is prevented from separating from the wedge, thereby ensuring that the keeper pin is positively locked in place. The shear pin and the ridge on the wedge block prevent the keeper pin from being "jacked out" either up or down as frequently happens in many keeper pins presently in use.

To remove the keeper pin from a connection of a tooth with the adaptor the wedge block is driven by the hammer downwardly, thus shearing the shear pin and allowing the keeper pin to fall through the opening. The keeper pin can be reused by replacing the shear pin that was previously sheared off.

The primary object of the present invention is to provide an improved mounting means for a keeper pin for coupling on excavation tooth to the front lip of an excavation bucket wherein the keeper pin can be used over and over again by merely replacing a shear pin on a keeper pin after the shear pin has been removed by a shearing action after it has been determined that the shear pin is to be replaced and to be coupled to a wedge block.

Another object of the present invention is to provide an improved keeper pin which interconnects a wedge and a wedge block in such a manner as to allow the keeper pin to be used over and over again merely by replacing a shear pin which is generally sheared off to separate the wedge and wedge block for purposes of replacing one or more parts of the system.

Other objects of this invention will become apparent as the following specification progresses, reference being had to the attached drawings illustrating the invention.

DESCRIPTION OF PREFERRED EMBODIMENT

Figure 1A:
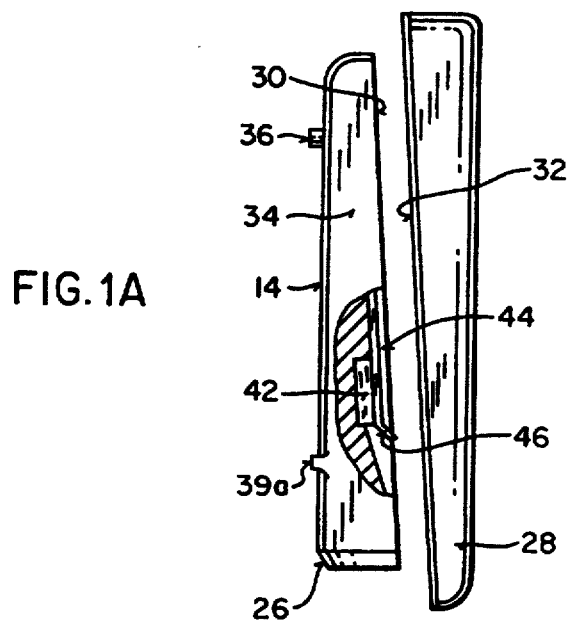
FIG. 1A is a side elevational view, partly in section, of the keeper pin showing the two parts thereof separated from each other.
Figure 1:
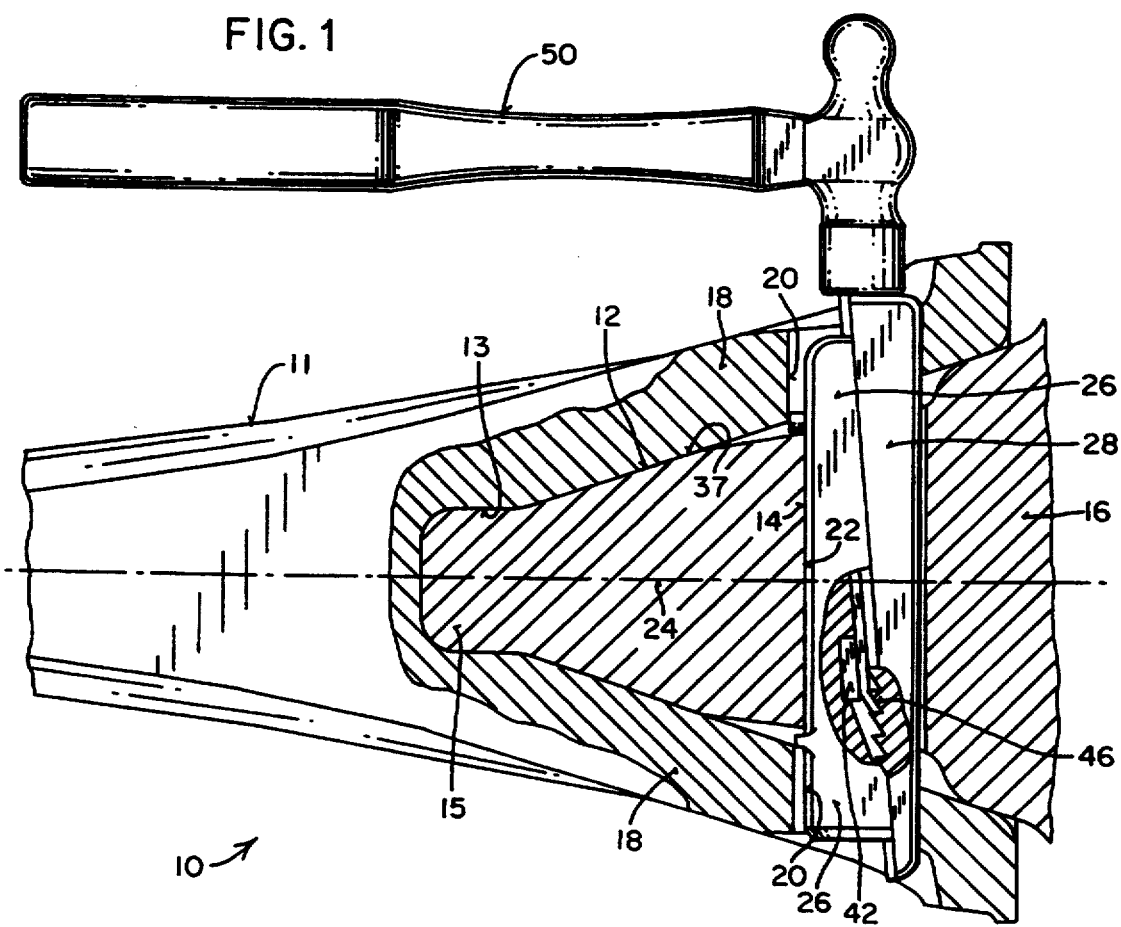
FIG. 1 is a top plan view, partly in section, of an excavation tooth mounted on the outer end of an adaptor by a keeper pin and showing the way in which the keeper pin is coupled to the tooth and the adaptor.

The tooth assembly of the present invention is broadly denoted by the numeral 10 and is shown in FIG. 1. Assembly 10 includes a tooth 11 which has a recess 13 for receiving the forward end 15 of an adaptor 12 forming part of an excavation bucket (not shown). The tooth 11 is removably and releasably held to adaptor 12 by a keeper pin 14 as hereinafter described. The adaptor 12 has an upstream end 16 which is adapted to be coupled to the bucket or to another excavation tool or piece of equipment.

Tooth 11 has a pair of sides 18 provided with respective openings 20 therethrough as shown in FIG. 1. These openings 20 mate with a passage 22 extending through the adaptor 12 transverse to the longitudinal axis 24 thereof (FIG. 1).

The keeper pin 14 is comprised of two main parts, namely the wedge block 26 and the wedge 28. Both wedge block 26 and wedge 28 are wedge shaped as shown in FIG. 1A and they both have respective flat faces 30 and 32 which slide over each other with respect to each other during installation and removal of the keeper pin 14.

Wedge block 26 includes a curved outer part 34 provided with a shear pin 36 which is adapted to engage the outer edge 37 (FIG. 1) of adaptor 12 when the tooth 11 is on the adaptor 12 as shown in FIG. 1 and keeper pin 14 is in the openings 20 and passage 22.

The flat inner face 30 (FIG. 1A) of wedge block 26 has a recess 39 formed therein for receiving a rubber block 42 to which a spring steel tooth 44 is bonded, the tooth 44 having a projection 46 at one end thereof.

Figure 3:
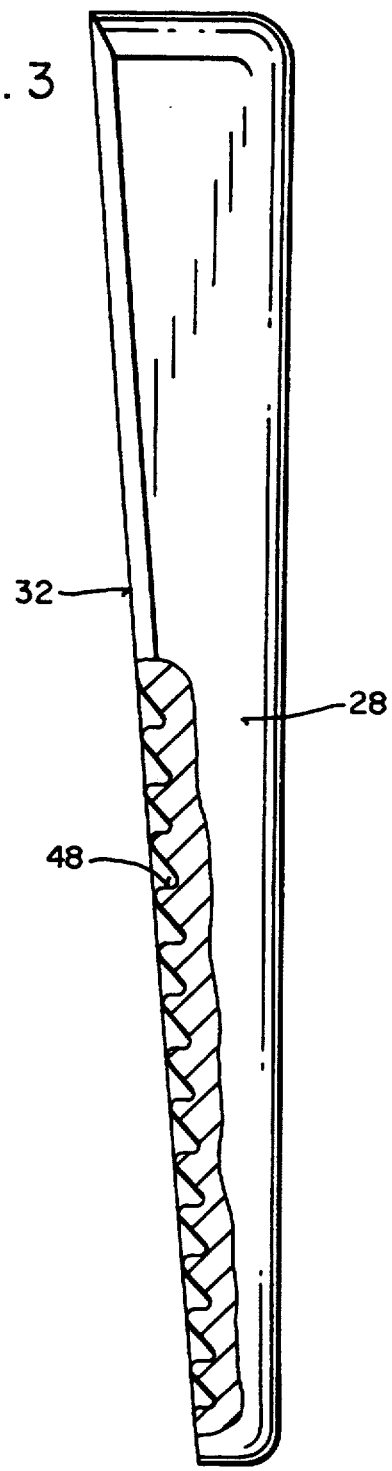
FIG. 3 is a side elevational view, on an enlarged scale, of the wedge of the keeper pin, parts of the keeper pin being sectionally illustrated to show details of construction.

The flat inner face 32 of wedge part 28 has a series of teeth 48 as shown in FIG. 3. These teeth are provided to engage the projection 46 (FIG. 3) of the wedge block. The teeth progressively receive projection 46 therebetween as the keeper pin progressively moves into the openings 20 and passage 22 provided in the tooth and the adaptor, respectively.

To insert or install tooth 11 on adaptor 12, the wedge block 26 is assembled with wedge 28 as shown in FIG. 1 with flat surfaces 30 and 32 in engagement with each other. Then the keeper pin 14 is inserted into hole 20 at one side of the tooth sidewall 18 and is then forced into the passage 22 and then through the other hole 20 in the other sidewall 18 of the tooth 11. With wedge block 26 in place, shear pin 36 is supported on and rests on the adjacent edge 39 of the adaptor 12 as shown in FIG. 1.

Wedge 28 is then inserted into the wedge-shaped space between wedge block 26 and the rear part of passage 22, and a hammer 50 is used to drive the wedge 28 into place until tightened. This requires only light strokes or blows by the hammer. When this occurs, the projection 46 on spring tooth 44 will be in a gap between a pair of adjacent teeth 48 (FIG. 3). This prevents the wedge block 26 from backing off and separating from wedge 28, thus ensuring that the keeper pin 14 will be positively locked in place. The shear pin 36 and the enlargement 39a (FIG. 1A) on wedge block 26 prevents the keeper pin 14 from being "jacked out" either up or down as frequently happens in many keeper pins presently in use.

Figure 2:
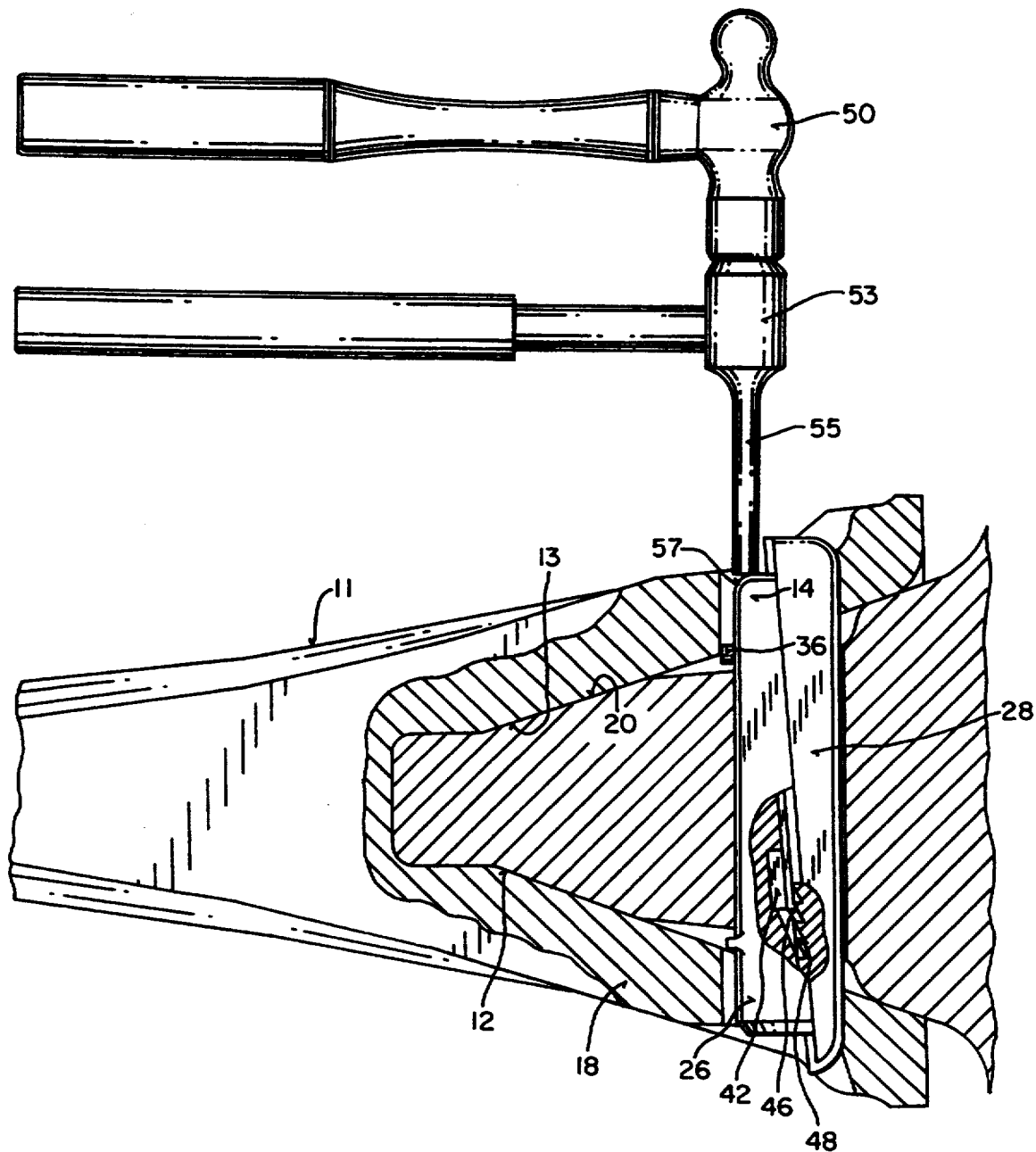
FIG. 2 is view similar to FIG. 1, showing the way in which the keeper pin is removed from its operative location connecting the tooth and the adaptor.
Figure 4:
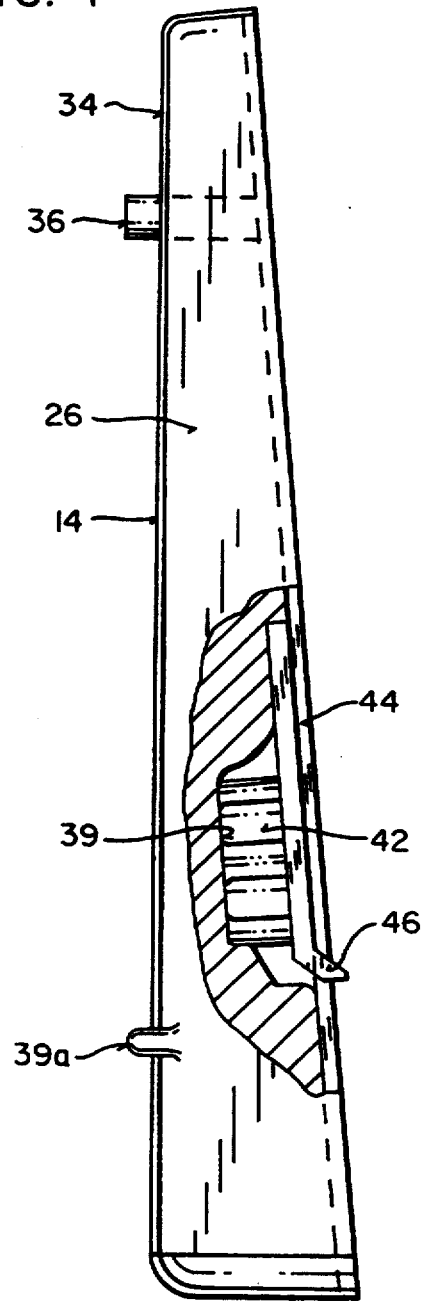
FIG. 4 is a view similar to FIG. 3 but showing the wedge block of the keeper pin.

To remove the keeper pin 14 from the connection thereof shown in FIG. 1, hammer 50 is caused to strike a tool 53 having a shaft 55 for engaging the upper surface 57 of wedge block 26 as shown in FIG. 2. When this occurs, this action shears pin 36, allowing keeper pin 14 to fall through the passage 32 and allowing separation of the tooth from the adaptor. Replacing the shear pin 36 and spring tooth 44 permits the reuse of keeper pin 14.

Figure 5:
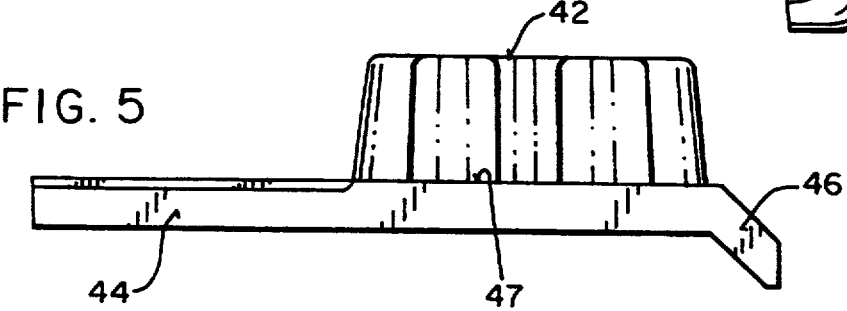
FIG. 5 is an enlarged side elevational view of the yieldable and resilient mount for the spring tooth of the wedge block of the keeper pin.

FIG. 5 shows a spring pin 44 with the end projection 46 thereon. The rubber block 42 is comprised of segments which are bonded together and are bonded to the inner flat face 47 of pin 44. The shape of the rubber block 42 is such that it complementally is received within the adjacent recess 39 and the flat inner face 32 of wedge block 26. FIG. 2 shows how the projection 46 extends into the recess between a pair of adjacent teeth and the wedge 28.

What is claimed is:

1. A tooth assembly for an excavation tool comprising:
    an adaptor having a front end;
    a tooth having a rear end and a recess in the rear end thereof for insertion over the front end of the adaptor, said adaptor and said tooth having respective, aligned passages therethrough;
    a keeper pin removably received in the passages for interconnecting the tooth and the adaptor, the keeper pin including a wedge block member and a wedge member;
    a shear pin carried by the keeper pin and engageable with an edge of the adaptor adjacent to one of said passages when the keeper pin is in said passages, said wedge member having a series of teeth thereon and the an elongated spring tooth having a pair of opposed ends, one of the ends of the spring tooth having a projection thereon; and
    means for yieldably mounting the opposite end of the spring tooth on the wedge block member, the projection being movable successively into and past the spaces between adjacent teeth of said series as the members are in the passages and as wedge member is moved relative to the other member.

2. An assembly as set forth in claim 1, the shear pin extending transversely to the longitudinal axis of the wedge block member.

3. An assembly as set forth in claim 1, wherein the projection has a flattened, transversely V-shaped outer end.

4. An assembly as set forth in claim 1, wherein said mounting means includes a resilient block bonded to the spring block.

5. An assembly as set forth in claim 1, wherein said wedge block member has a recess in one face thereof, said mounting means including a rubber block in the recess, said spring tooth being bonded to the rubber block, said projection being at the outer end of the spring tooth.

6. An assembly as set forth in claim 5, wherein said projection is oriented with reference to the gap between adjacent teeth so as to prevent reverse movement of the wedge relative to the wedge block.

7. An assembly as set forth in claim 1, wherein the wedge block member and the wedge member having respectively, substantially flat contiguous faces, the series of teeth being on the contiguous face of the wedge member and the projection being on the contiguous face of the wedge block member.

8. An assembly as set forth in claim 7, wherein the projection has a flattened, transversely V-shaped outer end.

9. An assembly as set forth in claim 7, wherein said spring tooth has a resilient block, said spring tooth being carried by the resilient block.

10. An assembly as set forth in claim 9, wherein the block has a flat face, said spring tooth having a flat surface engaging the flat face of the block.

11. An assembly as set forth in claim 7, wherein said projection is oriented with reference to the gap between adjacent teeth so as to prevent reverse movement of the wedge relative to the wedge block.

* * * * *